United States Patent
Kaneko et al.

(10) Patent No.: US 7,547,671 B2
(45) Date of Patent: Jun. 16, 2009

(54) DISCOLORATION REMOVAL CLEANING AGENT FOR TITANIUM AND TITANIUM ALLOY BUILDING MATERIALS, AND DISCOLORATION REMOVAL CLEANING METHOD

(75) Inventors: Michio Kaneko, Futtsu (JP); Kiyonori Tokuno, Chiyoda-ku (JP); Hiroshi Shimizu, Chiyoda-ku (JP); Takateru Dekura, Shinjuku-ku (JP)

(73) Assignee: Nippon Steel Corporation, Tokyo (JP)

( * ) Notice: Subject to any disclaimer, the term of this patent is extended or adjusted under 35 U.S.C. 154(b) by 582 days.

(21) Appl. No.: 10/509,814

(22) PCT Filed: Sep. 24, 2003

(86) PCT No.: PCT/JP03/12147

§ 371 (c)(1),
(2), (4) Date: Sep. 30, 2004

(87) PCT Pub. No.: WO2004/031333

PCT Pub. Date: Apr. 15, 2004

(65) Prior Publication Data

US 2005/0148481 A1   Jul. 7, 2005

(30) Foreign Application Priority Data

Sep. 30, 2002  (JP) ............................. 2002-287468

(51) Int. Cl.
*B08B 1/00* (2006.01)
(52) U.S. Cl. ............... 510/245; 510/372; 510/375; 134/6
(58) Field of Classification Search ........... 510/245, 510/372, 375; 134/6
See application file for complete search history.

(56) References Cited

U.S. PATENT DOCUMENTS

| 3,728,188 | A | * | 4/1973 | Yarrington | 216/101 |
| 3,844,859 | A | | 10/1974 | Roni | |
| 3,957,529 | A | | 5/1976 | Alexander et al. | |
| 4,102,824 | A | * | 7/1978 | Mizutani et al. | 510/289 |
| 4,213,796 | A | * | 7/1980 | Shaffer | 134/26 |
| 4,578,209 | A | * | 3/1986 | Hisamoto et al. | 510/412 |
| 4,863,524 | A | * | 9/1989 | Komabashiri et al. | 134/22.19 |
| 4,863,629 | A | * | 9/1989 | Osberghaus et al. | 510/421 |
| 5,512,202 | A | | 4/1996 | Borah | |
| 5,700,768 | A | * | 12/1997 | Lu | 510/214 |
| 6,008,183 | A | * | 12/1999 | Morioka et al. | 510/506 |
| 6,060,122 | A | | 5/2000 | Rossmaier | |
| 6,136,770 | A | * | 10/2000 | Cheung et al. | 510/384 |
| 6,303,556 | B1 | * | 10/2001 | Kott et al. | 510/357 |
| 6,380,145 | B1 | * | 4/2002 | Herbots et al. | 510/392 |
| 6,460,548 | B1 | * | 10/2002 | Gordon et al. | 134/25.2 |
| 6,472,360 | B1 | * | 10/2002 | Beggs et al. | 510/372 |
| 6,482,793 | B1 | * | 11/2002 | Gordon et al. | 510/475 |
| 6,551,974 | B1 | * | 4/2003 | Conrad et al. | 510/241 |
| 6,645,471 | B2 | * | 11/2003 | Cornelius et al. | 424/49 |
| 2002/0108640 | A1 | * | 8/2002 | Barger et al. | 134/26 |
| 2002/0166573 | A1 | * | 11/2002 | Policicchio et al. | 134/6 |
| 2002/0168216 | A1 | * | 11/2002 | Policicchio et al. | 401/270 |
| 2004/0053808 | A1 | * | 3/2004 | Raehse et al. | 510/447 |

FOREIGN PATENT DOCUMENTS

| EP | 1447461 A | 8/2004 |
| JP | 04323392 | 11/1992 |
| JP | 08-283970 A | 10/1996 |
| JP | 08283970 | 10/1996 |
| JP | 09241875 | 9/1997 |
| JP | 11256374 | 9/1999 |
| JP | 2001335978 | 12/2001 |
| WO | WO 03/035933 A1 | 5/2003 |

* cited by examiner

*Primary Examiner*—Mark Eashoo
*Assistant Examiner*—M. Rezaasdjodi
(74) *Attorney, Agent, or Firm*—Baker Botts LLP

(57) ABSTRACT

A removal cleaning agent for discolored sections of titanium building materials which comprises at least a water-soluble inorganic acid salt, an organic acid or organic acid salt, a surfactant and a hydrophilic oxygen-containing hydrocarbon solvent, and optionally an discoloration inhibitor, fluoracarbon resin and polishing material. In the cleaning method for discolored sections of titanium building materials, coating is carried out with a bristle brush and a sponge roller, the coated film sections are polished with a nonwoven fabric or foam resin, optionally after aging, and then the discolored sections are removed by washing with water.

25 Claims, No Drawings

DISCOLORATION REMOVAL CLEANING AGENT FOR TITANIUM AND TITANIUM ALLOY BUILDING MATERIALS, AND DISCOLORATION REMOVAL CLEANING METHOD

FIELD OF THE INVENTION

The present invention relates to a cleaning agent which exhibits an effect of removing discolored sections on the surfaces of titanium and titanium alloy building materials used for prolonged periods in outdoor applications, such as roofs, walls, monuments and the like, in order to restore the surfaces to a pre-discolored condition, while also enhancing the discoloration resistance after cleaning.

BACKGROUND ART

Titanium is used as a material for the construction of structures such as roofs and walls in seashore areas because of its excellent corrosion resistance against chlorides. Approximately 10 years have passed since the introduction of titanium for use in roofs and the like, and not a single case of corrosion has been reported.

Nevertheless, depending on the surrounding environment, titanium surfaces used for extended periods of time often exhibit discoloration to a dark gold color. This discoloration occurs due to the growth of an approximately 10 nm-thick titanium oxide layer on the titanium surface, with the discoloration producing a buffering effect which limits discoloration only to the outermost surface layer and therefore does not impair the anticorrosion effect of the titanium. However, it poses a problem from an aesthetic standpoint.

Since such discoloration is produced by growth of a titanium oxide layer on the titanium surface by acid rain which results in a buffering effect, removal of the titanium oxide layer can restore the surface to its condition before discoloration.

However, as titanium oxide is a chemically stable compound, it can only be chemically dissolved by coating the discolored sections with a mixed solution of nitric acid and hydrofluoric acid such as is ordinarily used for acid cleaning steps in titanium production processes. Restoration to the surface condition before discoloration is difficult, however, because the titanium base layer is also considerably dissolved. Mechanical methods also exist, and they include methods of polishing the discolored sections using polishing materials, but because the titanium oxide layer which is responsible for discoloration is only a few tens of nanometers thick, the titanium base layer surface also suffers polishing and surface outer appearance can thereby be altered. Prior art methods have accomplished removal of discolored layers by acid cleaning or polishing, with acceptance of a certain degree of outer appearance alteration of the base metal (for example, Materials and Process, 144th Fall Conference, CAMP-ISIJ Vol 15 (2002)-1306).

In addition, a titanium carbide layer in titanium surface which is another cause of discoloration is also present on the surface layer of the titanium base substrate under the titanium oxide layer discoloration. Therefore, as the titanium carbide remains on the titanium surface layer even after removal of the titanium oxide layer, rediscoloring upon prolonged use can still occur after cleaning.

Thus, removal of discolored sections of titanium and titanium alloy building materials remains a difficult task, while it is even more difficult to enhance discoloration resistance after removal.

In light of these circumstances, it is an object of the present invention to provide a cleaning agent for removing discolored sections produced on the surfaces of titanium and titanium alloy building materials without impairing the outer appearance of the base layers, as well as a discoloration removal cleaning agent and discoloration removal cleaning method which inhibit discoloration after the removal.

DISCLOSURE OF THE INVENTION

As a result of much diligent research directed toward the object of accomplishing removal of discoloration-causing titanium oxide layers and titanium carbide deposition layers on titanium surfaces without impairing the outer appearance of the titanium base layers, and enhancing discoloration resistance after their removal, the present inventors have made the following discovery.

The present inventors have found that, by preparing a cleaning agent as a weakly acidic liquid with appropriate viscosity, it is possible to remove discolored sections of titanium and titanium alloy building materials without their scattering during coating and cleaning. The inventors have also found that the dryness after coating can be adjusted by adding to the cleaning solution a hydrophilic oxygen-containing hydrocarbon having a water vapor-controlling function. It was additionally discovered that even extreme discolored sections can be removed by adjusting the aging time after coating. Finally, it was discovered that it is possible to form a protective film on the surface of titanium and titanium alloy building materials by a polishing operation after coating, and that discoloration can thereby be inhibited.

Specifically, based on this acquired knowledge, the present inventors have succeeded in developing a cleaning agent exhibiting the desired effects, comprising a combination of a water-soluble inorganic acid salt, organic acid or organic acid salt, a surfactant and a hydrophilic oxygen-containing hydrocarbon and, if necessary, a thickener, a discoloration inhibitor, a fluorocarbon resin and a polishing material, as well as a cleaning method using the cleaning agent.

The present invention has been completed based on the discoveries mentioned above, and its gist is as follows.

[1] A discoloration removal cleaning agent for titanium and titanium alloy building materials, characterized by comprising at least a water-soluble inorganic acid salt, an organic acid or organic acid salt, a surfactant, a hydrophilic oxygen-containing hydrocarbon solvent, and water.

[2] The discoloration removal cleaning agent for titanium and titanium alloy building materials according to [1] above, characterized in that the cleaning agent satisfies either or both of the following conditions (1) and (2):

(1) the cleaning agent comprises one or more types of thickener; and (2) the viscosity of the cleaning agent (measured at room temperature with a Brookfield viscometer) is 100-10,000 mPa·s.

[3] The discoloration removal cleaning agent for titanium and titanium alloy building materials according to [1] or [2] above, characterized in that the cleaning agent satisfies either or both of the following conditions (3) and (4):

(3) the cleaning agent comprises one or more types of fluorocarbon resin and one or more types of polishing material; and (4) the cleaning agent comprises one or more types of discoloration inhibitor.

[4] The discoloration removal cleaning agent for titanium and titanium alloy building materials according to [3] above, wherein the content of inorganic fluorine compound salts is 0.5-5.0 wt %.

[5] The discoloration removal cleaning agent for titanium and titanium alloy building materials according to any one of [1] to [4] above, wherein the organic acid or organic acid salt is at least one selected from the group consisting of formic acid, oxalic acid, citric acid, malic acid, lactic acid, tartaric acid, succinic acid, fumaric acid, gluconic acid, hydroxybutyric acid, ethylenediaminetetraacetic acid, hydroxyethylenediaminetetraacetic acid, diethylenetriaminopentaacetic acid, hydroxyethanediphosphonic acid, or salts, such as sodium, potassium and ammonium salts, of these organic acids.

[6] The discoloration removal cleaning agent for titanium and titanium alloy building materials according to any one of [1] to [5] above, wherein the content of the organic acid or organic acid salt is 2-15 wt %.

[7] The discoloration removal cleaning agent for titanium and titanium alloy building materials according to any one of [1] to [6] above, wherein the surfactant has an HLB (hydrophilic-lipophilic balance) value of 12 or greater.

[8] The discoloration removal cleaning agent for titanium and titanium alloy building materials according to any one of [1] to [7] above, wherein the organic acid or organic acid salt is at least one selected from the group consisting of anionic surfactants such as polyoxyethylenealkyl ether acetic acids and their sodium salts, polyoxyethylenealkyl ether phosphoric acids and their sodium salts, dialkylsulfosuccinic acids and their sodium salts, and nonionic surfactants such as polyoxyethylenealkyl ethers, polyoxyethylenealkylallyl ethers and polyoxyethylenepolyoxypropylenealkyl ethers.

[9] The discoloration removal cleaning agent for titanium and titanium alloy building materials according to any one of [1] to [8] above, wherein the content of the surfactant is 2-10 wt %.

[10] The discoloration removal cleaning agent for titanium and titanium alloy building materials according to any one of [1] to [9] above, wherein the hydrophilic oxygen-containing hydrocarbon is at least one selected from the group consisting of ethylene glycol, polyethylene glycol, propylene glycol, lower molecular weight polypropylene glycol, hexylene glycol, 1,3-butanediol, glycerin, methyldiglycol, methyltriglycol, ethyldiglycol, ethyltriglycol, butyldiglycol, butyltriglycol and N-methylpyrrolidone.

[11] The discoloration removal cleaning agent for titanium and titanium alloy building materials according to any one of [1] to [10] above, wherein the content of the hydrophilic oxygen-containing hydrocarbon is 5-20 wt %.

[12] The discoloration removal cleaning agent for titanium and titanium alloy building materials according to any one of [1] to [11] above, wherein the thickener is at least one selected from the group consisting of polyvinyl alcohol, methyl cellulose, hydroxyethyl cellulose, guar gum, xanthan gum, carboxyvinyl polymer, polyethylene oxide and polyvinylpyrrolidone.

[13] The discoloration removal cleaning agent for titanium and titanium alloy building materials according to any one of [1] to [12] above, wherein the content of the thickener is 0.2-1.5 wt %.

[14] The discoloration removal cleaning agent for titanium and titanium alloy building materials according to any one of [1] to [13] above, wherein the discoloration inhibitor is at least one selected from the group consisting of mercaptobenzothiazole-based, triazole-based, imidazole-based and thiourea-based discoloration inhibitors.

[15] The discoloration removal cleaning agent for titanium and titanium alloy building materials according to any one of [1] to [14] above, wherein the content of the discoloration inhibitor is 0.1-1.5 wt %.

[16] The discoloration removal cleaning agent for titanium and titanium alloy building materials according to any one of [1] to [15] above, wherein the fluorocarbon resin is at least one selected from the group consisting of polytetrafluoroethylene, polytetrafluoroethylene-hexafluoropropylene copolymer and polyvinylidene fluoride.

[17] The discoloration removal cleaning agent for titanium and titanium alloy building materials according to any one of [1] to [16] above, wherein the content of the fluorocarbon resin is 0.3-2.0 wt %.

[18] The discoloration removal cleaning agent for titanium and titanium alloy building materials according to any one of [1] to [17] above, wherein the polishing material is at least one selected from the group consisting of diamond, emery, garnet, corundum, ruby, silica sand, silicon carbide, alundum, cerium oxide, zirconium oxide, γ-alumina and chromium oxide.

[19] The discoloration removal cleaning agent for titanium and titanium alloy building materials according to any one of [1] to [18] above, wherein the content of the polishing material is 10-30 wt %.

[20] The discoloration removal cleaning method for titanium and titanium alloy building materials, wherein discolored sections of a titanium or titanium alloy building material are coated with the discoloration removal cleaning agent according to any one of [1] to [19] above and allowed to stand for a prescribed period of time, and then the cleaning agent is removed by water washing of the coated sections.

[21] The discoloration removal cleaning method for titanium and titanium alloy building materials according to [20] above, wherein the discoloration removal cleaning agent coated on the discolored sections of the titanium or titanium alloy building material is removed by high-pressure water washing (approximately 30-100 kg/cm$^2$, approximately 10-50 L/min) or low-pressure spray water washing (equal to or less than approximately 10 kg/cm$^2$, approximately 5-30 L/min) after standing for a prescribed period of time.

[22] The discoloration removal cleaning method for titanium and titanium alloy building materials according to [20] or [21] above, characterized in that the coated sections are subjected to polishing after the coating, if necessary after standing for a prescribed period of time, before water washing.

[23] The discoloration removal cleaning method for titanium and titanium alloy building materials according to [22] above, wherein the discoloration removal cleaning agent is removed by water washing after polishing.

[24] The discoloration removal cleaning method for titanium and titanium alloy building materials according to any one of [20] to [23] above, wherein the coating coverage of the discoloration removal cleaning agent is 50-200 g/m$^2$.

DETAILED DESCRIPTION OF THE PREFERRED EMBODIMENTS

The discoloration removal cleaning agent for discolored sections of titanium and titanium alloy building materials according to the invention (hereinafter referred to simply as "discoloration removal cleaning agent") exhibits a powerful discoloration removal effect for titanium and titanium alloy building materials by interaction between multiple cleaning components, and removal of the discolored sections of titanium and titanium alloy building materials is accomplished by combination of the water-soluble inorganic acid salt, organic acid or organic acid salt with the discolored sections of the titanium building material and also by the cleaning power of the water and the surfactant.

The discoloration removal cleaning agent of the invention comprises an inorganic acid salt, organic acid or organic acid salt, a surfactant, a hydrophilic oxygen-containing hydrocarbon (solvent) and water. The acidity of the cleaning agent is preferably pH 4.0-5.5 because the cleaning and removal effect for discolored sections of titanium and titanium alloy building materials is maximized in this range. If necessary, the acidity of the cleaning agent may be adjusted to within this range using an alkaline aqueous solution. Ammonia water is preferred as an alkaline aqueous solution, but caustic soda, bicarbonate soda and similar alkali solutions may also be used.

The components of the discoloration removal cleaning agent of the invention will now be explained.

An inorganic acid salt used in the discoloration removal cleaning agent of the invention has the function of removing discoloration on titanium and titanium alloy building materials, and it is preferably an inorganic fluorine compound salt (sodium salt, potassium salt, ammonium salt) which reacts with discolored sections. As examples of salts of inorganic fluorine compounds there may be mentioned sodium fluoride, potassium fluoride, ammonium fluoride, ammonium borofluoride, ammonium silicofluoride and the like, which may be used alone or in combinations of more than one. The content of fluorine compound salts in the discoloration removal cleaning agent of the invention will depend on the degree of discoloration of the discolored sections of the titanium or titanium alloy building material, but it is preferably 0.5-5.0 wt % and more preferably 0.7-3.0 wt %. It is preferably not less than 0.5 wt % because the discoloration removal effect will be weakened, while it is also preferably not greater than 5.0 wt % because the solubility in water will be reduced.

Organic acid and organic acid salts used in the discoloration removal cleaning agent of the invention have the function of converting calcium included in the titanium oxide layer of the discolored sections of the titanium or titanium alloy building material into calcium salts and dissolving or dispersing them into the cleaning agent, and they serve as discoloration removal aids. As examples of organic acids there may be mentioned formic acid, oxalic acid, citric acid, malic acid, lactic acid, tartaric acid, succinic acid, fumaric acid, gluconic acid, hydroxybutyric acid, ethylenediaminetetraacetic acid, hydroxyethylenediaminetetraacetic acid, diethylenetriaminopentaacetic acid and hydroxyethanediphosphonic acid, while sodium, potassium and ammonium salts may be mentioned as their salts. One or more of these organic acids and organic acid salts may be used.

The content of organic acids and organic acid salts in the discoloration removal cleaning agent of the invention will depend on the degree of discoloration of the discolored sections of the titanium or titanium alloy building material, but it is preferably 2-15 wt % and more preferably 3-10%. It is preferably not less than 2 wt % because the calcium removing power will be weakened, while it is preferably not greater than 15 wt % because the solubility in water will be reduced.

A surfactant used in the discoloration removal cleaning agent of the invention improves the permeability and wettability of the cleaning agent in the discolored sections of titanium and titanium alloy building materials by reducing the interfacial tension of the cleaning agent, and thereby exhibits an effective function of maximizing the cleaning effect. Anionic and nonionic surfactants are effective, and the HLB (hydrophilic-lipophilic balance) of hydrophilic groups is preferably 12 or greater. An HLB value of less than 12 is not preferred because it results in poor water solubility.

As examples of anionic surfactants there may be mentioned polyoxyethylenealkyl ether acetic acids and their sodium salts, polyoxyethylenealkyl ether phosphoric acids and their sodium salts and dialkylsulfosuccinic acids and their sodium salts, and as examples of nonionic surfactants there may be mentioned polyoxyethylenealkyl ethers, polyoxyethylenealkylallyl ethers and polyoxyethylenepolyoxypropylenealkyl ethers. One or more of these anionic or nonionic surfactants may be used. The surfactant content in the discoloration removal cleaning agent of the invention is preferably 2-10 wt % and more preferably 3-6 wt %. It is preferably not outside of this range because it will become difficult to achieve the desired effect as a surfactant.

A hydrophilic oxygen-containing hydrocarbon (oxygen-containing hydrocarbon solvent) used in the discoloration removal cleaning agent of the invention has the function of controlling evaporation of water, and addition of a water-soluble oxygen-containing hydrocarbon adjusts the drying property after coating of the cleaning agent while also improving compatibility with various compounded ingredients and providing an anti-freeze function. As examples of hydrophilic oxygen-containing hydrocarbons there may be mentioned ethylene glycol, polyethylene glycol, propylene glycol, low molecular weight polypropylene glycol, hexylene glycol, 1,3-butanediol, glycerin, methyldiglycol, methyltriglycol, ethyldiglycol, ethyltriglycol, butyldiglycol, butyltriglycol and N-methylpyrrolidone. One or more types of these hydrophilic oxygen-containing hydrocarbons may be used. The content of the hydrophilic oxygen-containing hydrocarbon in the discoloration removal cleaning agent of the invention is preferably 5-20 wt % and more preferably 10-15 wt %. It is preferably not outside of this range because it will become difficult to achieve the desired water vapor-controlling function.

The water used in the discoloration removal cleaning agent of the invention functions as a solvent, and tap water, ion-exchanged water, distilled water or other types of purified water may be used.

The discoloration removal cleaning agent of the invention may also contain, if necessary, one or more of the following components as additives in addition to the composition described above.

A thickener used in the discoloration removal cleaning agent of the invention allows adjustment of the viscosity by the amount of its addition to the discoloration removal cleaning agent, and it exhibits an effect against scattering and dripping. As examples of thickeners there may be mentioned polyvinyl alcohol, methyl cellulose, hydroxyethyl cellulose, guar gum, xanthan gum, carboxyvinyl polymer, polyethylene oxide and polyvinylpyrrolidone. One or more types of these thickeners may be used. The content of the thickener in the discoloration removal cleaning agent of the invention is preferably 0.2-1.5 wt % and more preferably 0.3-1.0 wt %. It is preferably not outside of this range because it will become difficult to achieve the desired effect as a thickener.

The viscosity of the discoloration removal cleaning agent of the invention is preferably 100-10,000 mPa·s (measured at ordinary temperature with a Brookfield viscometer, at 30 rpm). Within this range, it is possible to produce a coated film without dispersion of the solution to the surrounding areas during coating, and while avoiding dripping of the solution, especially when coating vertically standing titanium and titanium alloy building materials; this will aid the function of the discoloration removal cleaning agent.

As discoloration inhibitors to be used in the discoloration removal cleaning agent of the invention there may be mentioned mercaptobenzothiazole-based, triazole-based, imidazole-based and thiourea-based discoloration inhibitors, which are discoloration inhibitors for titanium and titanium alloy building materials. As specific examples there may be mentioned mercaptobenzothiazole propionic acid, mercaptobenzothiazole succinic acid, benzotriazole, methylimidazole, methylmercaptotetrazole, thiourea, dimethylthiourea, trimercapto-S-triazine sodium salt and the like, which may be used alone or in combinations of two or more. The content of discoloration inhibitors in the discoloration removal cleaning agent of the invention is preferably is 0.1-1.5 wt %, and more preferably 0.3-1.0 wt %. It is preferably not outside of this range because it will become difficult to achieve the desired effect as a discoloration inhibitor.

The discoloration removal cleaning agent of the invention can also function as a discoloration inhibitor by addition of a fluorocarbon resin and a polishing material, and subjecting discolored sections to polishing after their cleaning can produce a fluorocarbon resin film on the surface of the discolored sections and thereby prevent further discoloration.

Typical examples of fluorocarbon resins to be used for the invention include polytetrafluoroethylene, polytetrafluoroethylene-hexafluoropropylene copolymer and polyvinylidene fluoride, and a suitable fluorocarbon resin for the invention is low molecular weight polytetrafluoroethylene which has low surface energy and can effectively prevent production of discoloration substances on the surfaces of titanium and titanium alloy building materials. Lower molecular weight polytetrafluoroethylene may be produced by any method such as telomerization or lower molecularization by radiation cleavage. The lower molecular weight polytetrafluoroethylene preferably has a molecular weight of 2000-500,000 and more preferably 2000-25,000. The lower molecular weight polytetrafluoroethylene may also consist of lower molecular weight polytetrafluoroethylene alone or it may be a commercial product thereof such as a diluted dispersion (for example, a dispersion with a content of 10-20 wt %), and any such commercial products are suitable for use.

The content of the fluorocarbon resin in the discoloration removal cleaning agent of the invention is preferably 0.5-3.0 wt % and more preferably 0.3-2.0 wt %.

Polishing materials to be used for the invention may be selected from among inorganic fine particles of types, hardnesses and fine particle sizes effective for removal of discoloration from the discolored sections of titanium and titanium alloy building materials. As examples there may be mentioned diamond, emery, garnet, corundum, ruby, silica sand, silicon carbide, alundum, cerium oxide, zirconium oxide, γ-alumina and chromium oxide. The hardness of the polishing material is preferably 7 or greater (Mohs hardness) and more preferably 8 or greater (Mohs hardness). A hardness of less than 7 is not preferred because it will make the effect as a polishing material more difficult to achieve. One or more types of polishing materials may be used, and their mean particle sizes are preferably 1-100 μm and more preferably 30-50 μm. The mean particle sizes are preferably not outside of this range because this may make it difficult to achieve the effect as a polishing material. The polishing material content in the discoloration removal cleaning agent of the invention is preferably 10-30 wt % and more preferably 15-25 wt %. It is preferably not outside of this range because the desired effect as a polishing material becomes difficult to achieve.

A cleaning method employing the discoloration removal cleaning agent of the invention will now be explained.

The discoloration removal cleaning agent of the invention is coated onto the discolored sections of titanium and titanium alloy building materials and then allowed to permeate the discolored sections, so that removal of the discolored sections can be easily accomplished by water washing.

The coating method may be any desired procedure which allows the discoloration removal cleaning agent of the invention to be applied onto discolored sections, but preferred methods are coating with a bristle brush and coating with a sponge roller, painting roller or the like.

The discoloration removal cleaning agent coated on the discolored sections of the titanium or titanium alloy building material is allowed to stand for a prescribed period of time and is then removed and cleaned by water washing such as, for example, high-pressure water washing (approximately 30-100 kg/cm$^2$, approximately 10-50 L/min) or low-pressure spray water washing (equal to or less than approximately 10 kg/cm$^2$, approximately 5-30 L/min).

A prescribed period of time for standing after coating of the discoloration removal cleaning agent is effective for permeation and dissolution of the cleaning solution into the discolored sections, and it allows removal of strongly discolored sections to be accomplished more efficiently. The standing time may be selected as appropriate for the discolored section thickness and bonded strength. For example, a short standing time (about 10-15 minutes, for example,) may be sufficient in environments with higher air temperatures (about 25-35° C.), while a longer standing time (about 15-30 minutes, for example) may be required in environments with lower air temperatures (about 0-15° C.).

The drying after water washing is not particularly restricted so long as it does not adversely affect the surface of the titanium or titanium alloy building material, but natural drying at ordinary temperature is preferred.

A discoloration removal cleaning agent containing a fluoracarbon resin or polishing material according to the invention may also be coated with a bristle brush or with a sponge roller, painting roller or the like. In this case, the cleaning agent will not require a standing time after coating, and polishing may be carried out using a polishing fabric such as a resinous nonwoven fabric, either manually or with an electric polisher, thereby allowing removal of strongly discolored sections to be efficiently accomplished in a shorter period of time.

The water washing after polishing may be removal cleaning by water washing such as, for example, high-pressure water washing (approximately 30-100 kg/cm$^2$, approximately 10-50 L/min) or low-pressure spray water washing (equal to or less than approximately 10 kg/cm$^2$, approximately 5-30 L/min). The drying after water washing is not particularly restricted so long as it does not adversely affect the surface of the titanium or titanium alloy building material, but natural drying at ordinary temperature is preferred. The drainage water obtained from the water washing may be neutralized with aqueous slaked lime and subjected to treatment for separation of the precipitate using a flocculating agent or the like.

The coating coverage of the discoloration removal cleaning agent of the invention will depend on the degree of discoloration of the discolored sections of the titanium or titanium alloy building material, and it may be 50-200 g/m$^2$, for example, and is preferably 80-150 g/m$^2$.

Various improvements or partial modifications and additions may further be incorporated within the scope of the discoloration removal cleaning agent of the invention as described above, so long as the effect of the invention is not notably hindered.

EXAMPLES

The present invention will now be explained in greater detail based on the following examples, which are only illustrative and do not restrict the invention in any way.

Composition Example 1

A discoloration removal cleaning agent of the invention was prepared using the components shown in Table 1.

TABLE 1

| Component | Content (wt %) |
|---|---|
| Sodium fluoride (Morita Chemical Industries Co., Ltd.) | 1.0 |
| Potassium fluoride (Morita Chemical Industries Co., Ltd.) | 0.9 |
| Ammonium citrate (Fuso Chemical Co., Ltd.) | 5.0 |
| Hydroxyacetic acid (70 wt %) (U.S. DuPont Corp.) | 4.0 |
| Tetrasodium ethylenediaminetetraacetate (Chelest Corp.) | 1.0 |
| Hydroxyethanediphosphonic acid (Nippon Chemical Industrial Co., Ltd.) | 1.0 |
| Polyoxyethylene lauryl ether (Lion Corp.) | 3.0 |
| Polyoxyethylene lauryl ether acetate (Lion Corp.) | 2.0 |
| Mercaptobenzothiazolesuccinic acid (Ciba-Geigy Specialty Chemicals Corp.) | 0.3 |
| Dimethylthiourea (Kawaguchi Chemical Industry Co., Ltd.) | 0.2 |
| Polyethylene glycol #400 (NOF Corp.) | 15.0 |
| Purified water | 66.6 |
| | 100 |

Sodium fluoride, potassium fluoride, ammonium citrate, hydroxyacetic acid, tetrasodium ethylenediaminetetraacetate and hydroxyethanediphosphonic acid, weighed out in the proportions listed in Table 1, were placed in a polyethylene container A, the total amount of purified water was added and stirring was effected for complete dissolution of the solid portion.

Next, polyoxyethylene lauryl ether, polyoxyethylene lauryl ether acetate, mercaptobenzothiazolesuccinic acid and dimethylthiourea, weighed out in the proportions listed in Table 1, were placed in a polyethylene container B, the polyethylene glycol #400 was added and stirring was effected for complete dissolution.

The contents of container B were then added to and stirred in the polyethylene container A to prepare a uniform mixed solution.

The solution resulting after mixing had a viscosity (measured at ordinary temperature with a Brookfield viscometer, at 30 rpm) of 80 mPa·s and a pH of 4.0. A small amount of 28 wt % ammonia water was then added to adjust the pH to 5.0 for use as a discoloration removal cleaning agent (cleaning agent 1).

Composition Example 2

A discoloration removal cleaning agent of the invention was prepared using the components shown in Table 2.

TABLE 2

| Component | Content (wt %) |
|---|---|
| Ammonium borofluoride (Morita Chemical Industries Co., Ltd.) | 0.5 |
| Sodium fluoride (Morita Chemical Industries Co., Ltd.) | 1.0 |
| Ammonium citrate (Fuso Chemical Co., Ltd.) | 5.0 |
| Hydroxyacetic acid (70 wt %) (U.S. DuPont Corp.) | 4.0 |
| Tetrasodium ethylenediaminetetraacetate (Chelest Corp.) | 1.0 |
| Hydroxyethanediphosphonic acid (Nippon Chemical Industrial Co., Ltd.) | 1.0 |
| Polyoxyethylene lauryl ether (Lion Corp.) | 3.0 |
| Polyoxyethylene lauryl ether acetate (Lion Corp.) | 2.0 |
| Mercaptobenzothiazolesuccinic acid (Ciba-Geigy Specialty Chemicals Corp.) | 0.3 |
| Trimercapto-S-triazine sodium (Sankyo Kasei Co., Ltd.) | 0.2 |
| Polyethylene glycol #300 (NOF Corp.) | 15.0 |
| Xanthan gum (CP Kelco Aps) | 0.4 |
| Purified water | 66.6 |
| | 100 |

Sodium fluoride, ammonium borofluoride, ammonium citrate, hydroxyacetic acid, tetrasodium ethylenediaminetetraacetate and hydroxyethanediphosphonic acid, weighed out in the proportions listed in Table 2, were placed in a polyethylene container C, the total amount of purified water was added and stirring was effected for complete dissolution of the solid portion.

Next, polyoxyethylene lauryl ether, polyoxyethylene lauryl ether acetate, mercaptobenzothiazolesuccinic acid and trimercapto-S-triazine sodium, weighed out in the proportions listed in Table 2, were placed in a polyethylene container D, the polyethylene glycol #300 and xanthan gum were added and stirring was effected to obtain a uniform dispersion.

The dispersion of polyethylene container D was then added to and stirred in the polyethylene container C, and after addition of the total amount, stirring was effected at 200 rpm for 3 hours to obtain a viscous liquid.

The liquid had a viscosity (measured at ordinary temperature with a Brookfield viscometer, at 30 rpm) of 700 mPa·s and a pH of 4.0. A small amount of 28 wt % ammonia water was then added to adjust the pH to 5.0 for use as a discoloration removal cleaning agent (cleaning agent 2).

Composition Example 3

A discoloration removal cleaning agent of the invention was prepared using the components shown in Table 3.

TABLE 3

| Component | Content (wt %) |
|---|---|
| Sodium fluoride (Morita Chemical Industries Co., Ltd.) | 1.0 |
| Ammonium citrate (Fuso Chemical Co., Ltd.) | 5.0 |
| Hydroxyacetic acid (70 wt %) (U.S. DuPont Corp.) | 4.0 |
| Tetrasodium ethylenediaminetetraacetate (Chelest Corp.) | 1.0 |
| Hydroxyethanediphosphonic acid (Nippon Chemical Industrial Co., Ltd.) | 1.0 |
| Polyoxyethylene lauryl ether (Lion Corp.) | 3.0 |
| Polyoxyethylene lauryl ether acetate (Lion Corp.) | 2.0 |
| Mercaptobenzothiazolesuccinic acid (Ciba-Geigy Specialty Chemicals Corp.) | 0.3 |
| Trimercapto-S-triazine sodium (Sankyo Kasei Co., Ltd.) | 0.2 |
| Polyethylene glycol #300 (NOF Corp.) | 15.0 |
| Xanthan gum (CP Kelco Aps) | 0.4 |
| Alumina fine powder (Showa Denko K.K.) | 20.0 |
| Polytetrafluoroethylene (15 wt % dispersion (U.S. DuPont Corp.) | 6.0 |
| Purified water | 41.1 |
| | 100 |

Sodium fluoride, ammonium citrate, tetrasodium ethylenediaminetetraacetate, hydroxyacetic acid and hydroxyethanediphosphonic acid, weighed out in the proportions listed in Table 3, were placed in a polyethylene container E, the total amount of purified water was added and stirring was effected for complete dissolution of the solid portion.

Next, polyoxyethylene lauryl ether, polyoxyethylene lauryl ether acetate, mercaptobenzothiazolesuccinic acid and polyethylene glycol #300, weighed out in the proportions listed in Table 3, were added to a polyethylene container F and stirred to a uniform mixed solution, and xanthan gum was added in small portions at a time to obtain a uniform dispersion.

The dispersion of polyethylene container F was then added to polyethylene container E while stirring, and after addition of the total amount, the polytetrafluoroethylene dispersion was further added and stirring was effected at 200 rpm for 6 hours to obtain a viscous liquid. Next, the alumina fine particles weighed out in the listed amount were added to polyethylene container E in small portions at a time, and after the addition, stirring was effected at 200 rpm for 2 hours to obtain a uniform viscous liquid.

The liquid had a viscosity (measured at ordinary temperature with a Brookfield viscometer, at 30 rpm) of 3200 mPa·s and a pH of 4.5. A small amount of 28 wt % ammonia water was then added to adjust the pH to 5.0 for use as a discoloration removal cleaning agent (cleaning agent 3).

Example 1

A test sample was prepared using a cold-rolled TP270C titanium building material conforming to JIS H4600, surface-finished by annealing in an argon gas atmosphere and having the annealed surface dull finished by roll calendering with a dull roll. This material which had been exposed to an outdoor environment for 7 years was cut into samples with dimensions of 1.2 mm thickness, 60 mm width and 80 mm length according to JIS K2246 4.2.1. The hue of each of the test samples was light black with a shade of purplish-gold, and the thickness of the hue was 70-80 nm (as measured using an auger electron spectrometer by JEOL Co., Ltd.). The same titanium building material without outdoor exposure was used for the basis of evaluation by the following visual examination.

The discoloration removal cleaning agents prepared in Composition Examples 1 and 2 (cleaning agents 1 and 2) were used for a removal cleaning test on the discolored sections of the aforementioned samples. The samples were evenly coated with the discoloration removal cleaning agents 1 and 2 using a bristle brush. The coating coverage of cleaning agent 1 was 65-70 g/m$^2$, and the coating coverage of cleaning agent 2 was 95-100 g/m$^2$. The cleaning agents were water washed using tap water for aging times of 15, 30 and 45 minutes after coating and then dried, and changes in the discolored sections of the samples were visually examined.

As a comparative example, a cleaning test was also conducted using a commercially available neutralizing agent (Mama Lemon, product of Lion Corp.), producing the results shown as Comparative Example 1. A sponge was used to evenly coat a test sample, and a sponge was also used to clean the test sample surface under flowing tap water, with aging times of 15, 30 and 45 minutes after coating.

The discolored sections of the cleaned test samples were evaluated visually by at least five evaluators. Almost all of the evaluators confirmed that the samples treated after an aging time of 30 minutes using cleaning agent 1 or cleaning agent 2 were comparable to the unexposed test sample.

Table 4 shows the results of the discoloration removal test. The proportion of discoloration removed was evaluated using a 50×50 mm measurement area of the measurement sheet, according to JIS K2246 Salt Spray Test 4.3.4. The evaluation was conducted on a 3-level scale of A, B and C, with evaluation of A for a test sample with no discoloration compared to the unexposed material, evaluation of B for a test sample with thin discoloration remaining (remaining on greater than 0% and less than 10% of the area), and evaluation of C for a test sample with discoloration remaining on 10-20% of the area. The values in parentheses to the right of the letters of evaluations A-C are the results of color difference measurement before and after the cleaning test, and the color difference $[\Delta E=((L^*_2-L^*_1)^2+(a^*_2-a^*_1)^2+(b^*_2-b^*_1)^2)^{1/2}]$ before and after the test was used as the basis for evaluating the discoloration resistance. Here, $L^*_1$, $a^*_1$ and $b^*_1$ represent the measurement results for the hue before the discoloration test, and $L^*_2$, $a^*_2$ and $b^*_2$ represent the measurement results for the hue after the discoloration test, based on the L*a*b* color index specified in the method of JIS Z8729.

TABLE 4

| | Aging time after coating of cleaning agent (ordinary temperature) | | |
|---|---|---|---|
| | After 15 minutes | After 30 minutes | After 45 minutes |
| Discoloration sample coated with Comp. Ex. 1 | C (ΔE = 25.4) | C (ΔE = 24.7) | C (ΔE = 23.8) |
| Discoloration sample coated with cleaning agent 1 | C (ΔE = 14.3) | A (ΔE = 3.4) | A (ΔE = 3.2) |
| Discoloration sample coated with cleaning | B (ΔE = 8.3) | A (ΔE = 2.8) | A (ΔE = 2.7) |

TABLE 4-continued

|  | Aging time after coating of cleaning agent (ordinary temperature) | | |
| --- | --- | --- | --- |
|  | After 15 minutes | After 30 minutes | After 45 minutes |
| agent 2 Discoloration sample coated with cleaning agent 3 | B (ΔE = 7.9) | A (ΔE = 2.6) | A (ΔE = 2.5) |

Example 2

A test sample was prepared using a cold-rolled TP270C titanium building material conforming to JIS H4600, surface-finished by annealing in an argon gas atmosphere, and exposed to an outdoor environment for 7 years. The material was cut into samples with dimensions of 1.2 mm thickness, 60 mm width and 80 mm length. It was then coated with cleaning agent 3 using a painting sponge roller. The coating coverage was 110-120 g/m².

After coating, the sample was immediately subjected to polishing with repeated movements of 10, 30 and 50 strokes using a polishing tool with a urethane nonwoven fabric and then cleaned with tap water, after which the proportion of discoloration was visually examined. Almost all of five or more evaluators conducting the visual examination confirmed that the test sample subjected to 30 polishing strokes was comparable to the unexposed test sample.

TABLE 5

|  | Number of polishing strokes with urethane nonwoven fabric after coating of cleaning agent | | |
| --- | --- | --- | --- |
|  | 10 strokes | 30 strokes | 50 strokes |
| Discolored sample coated with cleaning agent 3 | C | A | B |

Table 5 shows the results of the discoloration removal test. The evaluation was conducted on a 3-level scale of A, B and C, with evaluation of A for a test sample with no discoloration compared to the unexposed material, evaluation of B for a test sample with no discoloration but slight scuffing remaining on 5-10% of the area, and evaluation of C for a test sample with light discoloration remaining on 10-20% of the area.

INDUSTRIAL APPLICABILITY

The discoloration removal cleaning agent for discolored sections of titanium building materials according to the present invention is industrially applicable due to its numerous effects including the following (1) to (4).

(1) A discoloration removal cleaning agent is provided which allows removal of discolored sections on titanium and titanium alloy building materials by water washing.

(2) The discoloration removal cleaning agent of the invention provides discoloration-free protection for prolonged periods due to the function of a fluoracarbon resin film and discoloration inhibitor which impart excellent discoloration resistance to areas of titanium and titanium alloy building materials which have been cleaned by a simple operation. That is, it provides an anti-discoloration property which persists until the next cleaning, even under conditions of contact with highly polluted environments such as large cities.

(3) In the cleaning operation using the discoloration removal cleaning agent of the invention, no special experience is required for removal of discolored sections produced on the surfaces of titanium and titanium alloy building materials which have been in use for prolonged periods, such as outdoor roofs and walls, while an excellent discoloration removal effect is exhibited.

(4) The cleaning operation using the discoloration removal cleaning agent of the invention can be carried out on roofs and their adjacent walls which are made of titanium and titanium alloy building materials, in a satisfactory working environment without scattering or dripping of the discoloration removal cleaning agent. The drainage water obtained from water washing may be neutralized with aqueous slaked lime and subjected to treatment for separation of the precipitate using a flocculating agent or the like.

The invention claimed is:

1. A discoloration removal cleaning agent for at least one of a titanium building material and a titanium alloy building material, comprising:
   a water-soluble inorganic acid salt of potassium fluoride in an amount of 0.5 to 5.0 wt %;
   a composition including one of an organic acid and an organic acid salt in an amount of 2 to 15 wt %;
   a surfactant in an amount of 2 to 10 wt %;
   a hydrophilic oxygen-containing hydrocarbon solvent in an amount of 5 to 20 wt %; and
   the remainder, water.

2. The discoloration removal cleaning agent according to claim 1, wherein:
   the cleaning agent comprises one or more types of a fluorocarbon resin and one or more types of a polishing material, and
   the cleaning agent comprises one or more types of a discoloration inhibitor.

3. The discoloration removal cleaning agent according to claim 1, wherein the composition includes at least one of an formic acid, an oxalic acid, a citric acid, a malic acid, a lactic acid, a tartaric acid, a succinic acid, a fumaric acid, a gluconic acid, a hydroxybutyric acid, an ethylenediaminetetraacetic acid, a hydroxyethylenediaminetetraacetic acid, a diethylenetriaminopentaacetic acid, a hydroxyethanediphosphonic acid, and a particular salt.

4. The discoloration removal cleaning agent according to claim 3, wherein the particular salt includes at least one of a sodium salt, a potassium salt and an ammonium salt.

5. The discoloration removal cleaning agent according to claim 1, wherein a surfactant has a hydrophilic-lipophilic balance value of at least 12.

6. The discoloration removal cleaning according to claim 1, wherein the composition is at least one of anionic surfactants and nonionic surfactants.

7. The discoloration removal cleaning according to claim 6, wherein anionic surfactants include at least one of polyoxyethylenealkyl ether acetic acids, sodium salts thereof polyoxyethylenealkyl ether phosphoric acids and sodium salts thereof, dialkylsulfosuccinic acids and sodium salts thereof.

8. The discoloration removal cleaning according to claim 6, wherein nonionic surfactants include polyoxyethylenealkyl ethers, polyoxyethylenealkylallyl ethers and polyoxyethylenepolyoxypropylenealkyl ethers.

9. The discoloration removal cleaning agent according to claim 1, wherein the hydrophilic oxygen-containing hydrocarbon is at least one of ethylene glycol, polyethylene glycol, propylene glycol, lower molecular weight polypropylene glycol, hexylene glycol, 1,3-butanediol, glycerin, methyldiglycol, methyltriglycol, ethyldiglycol, ethyltriglycol, butyldiglycol, butyltriglycol and N-methylpyrrolidone.

10. The discoloration removal cleaning agent according to claim 1, further comprising a discoloration inhibitor which is at least one of mercaptobenzothiazole-based inhibitors, triazole-based inhibitors, imidazole-based inhibitors and thiourea-based discoloration inhibitors.

11. The discoloration removal cleaning agent according to claim 10, wherein a content of the discoloration inhibitor is about 0.1-1.5 wt %.

12. The discoloration removal cleaning agent according to claim 1, further comprising a fluorocarbon resin which is at least one of polytetrafluoroethylene, polytetrafluoroethylene-hexafluoropropylene copolymer and polyvinylidene fluoride.

13. The discoloration removal cleaning agent according to claim 12, wherein a content of the fluorocarbon resin is about 0.3-2.0 wt %.

14. The discoloration removal cleaning agent according to claim 1, further comprising a polishing material which is at least one of diamond, emery, garnet, corundum, ruby, silica sand, silicon carbide, alundum, cerium oxide, zirconium oxide, γ-alumina and chromium oxide.

15. The discoloration removal cleaning agent according to claim 14, wherein a content of the polishing material is about 10-30 wt %.

16. The discoloration removal cleaning agent according to claim 1, wherein said cleaning agent satisfies either or both of the following conditions:
   said cleaning agent comprises one or more types of thickener; and
   the viscosity of said cleaning agent, measured at room temperature with a Brookfield viscometer, is 100-10,000 mPa·s.

17. The discoloration removal cleaning agent according to claim 16, wherein the thickener is at least one of polyvinyl alcohol, methyl cellulose, hydroxyethyl cellulose, guar gum, xanthan gum, carboxyvinyl polymer, polyethylene oxide and polyvinylpyrrolidone.

18. The discoloration removal cleaning agent according to claim 16, wherein a content of the thickener is about 0.2-1.5 wt %.

19. The discoloration removal cleaning agent according to claim 1, wherein said discoloration removal cleaning agent has a pH of 4.0 to 5.5.

20. A discoloration removal cleaning method for a particular material which is at least one of a titanium building material and a titanium alloy building material, comprising the steps of:
   a) coating discolored sections of the particular material with a discoloration removal cleaning agent, the cleaning agent including a water-soluble inorganic acid salt of potassium fluoride in an amount of 0.5 to 5.0 wt %, a composition including one of an organic acid and an organic acid salt in an amount of 2 to 15 wt %, a surfactant in an amount of 2 to 10 wt %, a hydrophilic oxygen-containing hydrocarbon solvent in an amount of 5 to 20 wt %, and the remainder, water;
   b) allowing the coated sections to stand for a predetermined time period; and
   c) removing the cleaning agent by water washing the coated sections.

21. The discoloration removal cleaning method according to claim 20, wherein, after step (b), step (c) is performed by at least one of high-pressure water washing at approximately 30-100 kg/cm$^2$ and approximately 10-50 L/min, and low-pressure spray water washing that is at most approximately 10 kg/cm$^2$ and approximately 5-30 L/min.

22. The discoloration removal cleaning method according to claim 21, further comprising the step of:
   d) after steps (a) and (b) and before step (c), polishing the coated section, if necessary.

23. The discoloration removal cleaning method according to claim 22, wherein step (c) is performed by water washing after step (d).

24. The discoloration removal cleaning method according to claim 20, wherein a coating coverage of the discoloration removal cleaning agent performed in step (a) is about 50-200 g/m$^2$.

25. The discoloration removal cleaning method according to claim 20, wherein said discoloration removal cleaning agent has a pH of 4.0 to 5.5.

* * * * *